United States Patent [19]

Stollmaier et al.

[11] Patent Number: 5,837,762
[45] Date of Patent: Nov. 17, 1998

[54] LATEX-BASED COATING COMPOSITION

[75] Inventors: Friederike Theresia Stollmaier, Rheinmuenster; Dominik Martin Elsaesser, Lauf, both of Germany; Pekka Johannes Salminen, Siebuen, Switzerland

[73] Assignee: The Dow Chemical Company, Midland, Mich.

[21] Appl. No.: 578,597

[22] PCT Filed: Jul. 8, 1994

[86] PCT No.: PCT/US94/07622

§ 371 Date: Jan. 4, 1996

§ 102(e) Date: Jan. 4, 1996

[87] PCT Pub. No.: WO95/02087

PCT Pub. Date: Jan. 19, 1995

[30] Foreign Application Priority Data

Jul. 8, 1993 [GB] United Kingdom ............... 9314149

[51] Int. Cl.$^6$ ....................................... C08J 5/24
[52] U.S. Cl. .................................. 524/274; 524/822
[58] Field of Search .......................... 524/822, 274

[56] References Cited

U.S. PATENT DOCUMENTS

| | | | |
|---|---|---|---|
| 4,148,770 | 4/1979 | Stahle et al. | 260/770 |
| 4,478,974 | 10/1984 | Lee et al. | 524/533 |
| 4,968,740 | 11/1990 | Makati et al. | 524/501 |
| 5,008,329 | 4/1991 | Abe et al. | 524/798 |
| 5,137,977 | 8/1992 | Saitoh et al. | 525/282 |
| 5,194,539 | 3/1993 | Charmot et al. | 526/220 |

FOREIGN PATENT DOCUMENTS

| | | |
|---|---|---|
| 0295399 | 12/1988 | European Pat. Off. . |
| 0469954 | 2/1992 | European Pat. Off. . |
| 3277602 | 12/1991 | Japan . |

*Primary Examiner*—Peter D. Mulcahy

[57] ABSTRACT

The present invention refers to polymer latex compositions, such as, for example, styrene-butadiene-based or styrene-acrylate-based latices, prepared with sulfur- and halogen-free chain transfer agents, wherein the sulfur- and halogen-free chain transfer agents are abietic acid-containing rosins, such as abietic acid-containing gum rosin. The polymer latex compositions of the present invention exhibit surprisingly high binding strength despite high gel content, and a balanced application profile of paper gloss, ink gloss and ink set-off properties. The polymer latex compositions of the present invention further exhibit the advantage of being of less odor than typical latex-based paper coating compositions.

19 Claims, No Drawings

LATEX-BASED COATING COMPOSITION

The present invention refers to polymer latex compositions, more particularly, to polymer latex compositions prepared with a sulfur-free and halogen-free chain transfer agent useful in paper coating applications.

Polymer latices useful in paper coating applications need to provide good dry and wet pick strength properties. It is well-known that sulfur- and halogen-containing chain transfer agents provide polymer latices with molecular weights suitable to exhibit high strength. Halogenated chain transfer agents have been extensively used in the past, however less and less in the recent years due to environmental concerns. On the other hand, sulfur-containing chain transfer agents, under certain extreme application conditions, can lead to undesirable odor contribution in the coated paper.

In view of the outlined deficiencies, there is still a need for polymer latex compositions which are prepared with sulfur-free and halogen-free chain transfer agents, whose binding properties, that is, wet and dry pick strength properties, remain comparable to a polymer latex composition prepared with sulfur-containing and/or halogen-containing chain transfer agents.

Accordingly, in one aspect, the present invention is a polymer latex composition having a glass transition temperature between $-10°$ C. and $70°$ C. prepared with a sulfur- and halogen-free chain transfer agent comprising, in polymerized form, (A) from 10 weight percent to 80 weight percent of monovinylidene aromatic monomer(s); (B) from 0 weight percent to 65 weight percent of conjugated diene monomer(s); (C) from 0 weight percent to 70 weight percent of acrylate monomer(s); and (D) the remaining amount of other polymerizable comonomer(s); with the proviso that the combined weight percentage of components (B) and (C) is greater than zero and wherein the sulfur- and halogen-free chain transfer agent is an abietic acid-containing rosin.

Surprisingly, it has been found that the polymer latex compositions of the present invention which are prepared by using an abietic acid-containing rosin as a chain transfer agent give, under certain extreme application conditions, less odor than latex compositions prepared with the usual sulfur-based chain transfer agents, while exhibiting unexpectedly good binding properties, such as high wet and dry binding strength despite high gel content, and a balanced application profile of paper gloss, ink gloss and ink set-off properties.

Latices useful in the practice of the present invention include latices prepared with sulfur- and halogen-free chain transfer agents comprising an aqueous dispersion having dispersed therein a polymeric phase, comprising, in polymerized form, monovinylidene aromatic monomer(s), conjugated diene monomer(s) and/or acrylate monomer(s). Typically, these latices have glass transition temperatures (Tg) of less than $70°$ C., preferably less than $40°$ C., and most preferably less than $35°$ C. but not less than $-10°$ C., as measured using a differential scanning calorimeter. Optionally, these latices can contain other polymerizable comonomers, such as ethylenically unsaturated carboxylic acid monomers, nitrile monomers, vinyl ester monomers, hydroxyalkyl-(meth)acrylate monomers, alkoxyalkyl(meth) acrylate monomers and (meth)acrylamide monomers.

The sulfur- and halogen-free chain transfer agents useful in the present invention are the so-called rosins. Typically, there are three types of rosins: (a) gum rosin which is obtained from oleo resin exuded from the wound of living pine trees and distillation of volatile turpentine; (b) wood rosin obtained by solvent extraction of pine stump wood along with removal of the turpentine by steam distillation; and (c) tall oil rosin obtained by the separation of tall oil using the sulphate or Kraft process. The main components of gum rosin are a number of isomeric rosin acids, such as monocarboxylic acids of the alkyl hydrophenanthrene type (abietic acid type) having a molecular formula $C_{20}H_{30}O_2$.

The preferred rosins for use in the present invention are the gum rosins. Representative gum rosins include acid-containing gum rosins, preferably abietic acid-containing gum rosins having a color grade of K, M, or N, preferably WG, WW or X, most preferably WW, as measured by ASTM method D-509-70.

The abietic acid-containing gum rosins useful in the present invention are employed in amounts of from 0.1 to 15, preferably from 1 to 10, more preferably from 1.5 weight parts to 9 weight parts, most preferably from 3 weight parts to 6 weight parts, per 100 weight parts of total monomers.

Representative monovinylidene aromatic monomers include, for example, styrene, $\alpha$-methylstyrene, p-methyl styrene, t-butyl styrene, and vinyltoluene. Mixtures of one or more monovinylidene aromatic monomers can also be employed. The preferred monomers are styrene and $\alpha$-methylstyrene. The monovinylidene aromatic monomer is generally employed in a range from 10 to 80 weight percent, preferably from 25 to 75 weight percent, most preferably from 35 to 70 weight percent, based on the total weight of the monomers.

Conjugated diene monomers useful to prepare latices (A) or (B) include conjugated diene monomers, such as, for example, 1,3-butadiene, isoprene, and 2,3-dimethyl-1,3-butadiene. 1,3-butadiene is preferred in the present invention. Typically, the amount of conjugated diene monomer (if used) present in the polymeric phase will range from 0 to 65 weight percent, preferably 20 to 65 weight percent, more preferably 20 to 55 weight percent, more preferably 25 to 51 weight percent, most preferably 25 to 39 weight percent, based on the total weight of the monomers.

Acrylate monomers useful in the present invention include, for example, n-, iso- or tert-alkyl esters of acrylic or methacrylic acid, wherein the alkyl group has from 1 to 20 carbon atoms, the reaction product of (meth)acrylic acid with the glycidyl ester of a neo-acid such as versatic, neo-decanoic or pivalic acid. Additionally, acrylate monomers can include acids, esters, amides of the (meth)acrylic acid, and substituted derivatives thereof.

Generally, the preferred acrylate monomers are $C_1$–$C_{10}$ alkyl(meth)acrylates or alkoxy $C_1$–$C_{10}$ alkyl (meth) acrylates, most preferably $C_1$–$C_8$ alkyl (meth)acrylates or alkoxy $C_1$–$C_8$ alkyl(meth)acrylates. Examples of such acrylate monomers include n-butyl acrylate, sec-butyl acrylate, ethyl acrylate, hexyl acrylate, tert-butyl acrylate, 2-ethylhexyl acrylate, iso-octyl acrylate, 4-methyl-2-pentyl acrylate, 2-methylbutyl acrylate, methyl methacrylate, butyl methacrylate, n-butyl methacrylate, isobutyl methacrylate, ethyl methacrylate, isopropyl methacrylate, hexyl methacrylate, cyclohexyl methacrylate, and cetyl methacrylate, methoxyethyl methacrylate, ethoxyethyl methacrylate, methoxyethyl acrylate, ethoxyethyl acrylate, butoxyethyl methacrylate, methoxybutyl acrylate and methoxyethoxyethyl acrylate.

Preferred acrylate monomers are n-butyl acrylate, butyl methacrylate, 2-ethylhexyl acrylate, and methyl methacrylate, with methyl methacrylate and n-butyl acrylate being especially preferred. Frequently, two or more acrylate monomers are used. The alkyl esters of acrylic or methacrylic acid and alkoxyalkyl(meth)acrylate monomers can be employed as a portion of the monomer mixture.

Typically, the amount of acrylate monomer (if used) present in the polymeric phase will depend on the monomer chosen, however, the typical range will be from 0 to 70 weight percent, preferably 0 to 60 weight percent, most preferably 0 to 51 weight percent, based on the total weight of the monomers.

It is critical that the combined weight percentage of conjugated diene monomer(s) (component (B)) and acrylate monomer(s) (component (C)) is greater than zero, preferably greater than 10 weight percent.

As aforementioned, other polymerizable comonomers include, for example, ethylenically unsaturated carboxylic acid monomers, nitrile monomers, vinyl ester monomers, hydroxyalkyl-(meth)acrylate monomers, alkoxyalkyl(meth)acrylate monomers, (meth)acrylamide monomers.

The ethylenically unsaturated carboxylic acid monomers suitable for use in the present invention include monocarboxylic and dicarboxylic monomers and their monoesters. The addition of such an ethylenically unsaturated carboxylic acid monomer has been generally found to improve the stability of the latex and adhesion of the latex films which makes them suitable for use in paper coating formulations. It is preferred for the practice of the present invention to use ethylenically unsaturated aliphatic mono- or dicarboxylic acid(s) or acid anhydride(s) containing 3 to 5 carbon atoms. Exemplary monocarboxylic acid monomers include, for example, acrylic acid, methacrylic acid; and exemplary dicarboxylic acid monomers include, for example, fumaric acid, itaconic acid, crotonic acid, maleic acid, and maleic anhydride.

The use of ethylenically unsaturated carboxylic acid monomer affects the properties of the polymer dispersion and coatings prepared therefrom. The type and amount of this monomer are determined thereby. Typically, such an amount is from 0 to 20 weight percent, preferably 0 to 10 weight percent, most preferably 1 to 10 weight percent, based on the total weight of the monomers.

Nitrile monomers useful in this invention include polymerizable unsaturated aliphatic nitrile monomers containing 2 to 4 carbon atoms in a linear or branched-chain which may optionally be substituted with acetyl, or additional nitrile groups. Such nitrile monomers include, for example, acrylonitrile, methacrylonitrile, and fumaronitrile, with acrylonitrile being preferred. This nitrile monomer (if used) can be included in amounts up to about 25 parts by weight, preferably 0 to 15 parts by weight, based on 100 total weight parts of monomers.

Vinyl ester monomers useful herein include vinyl acetate, vinyl propionate, vinyl butyrate, vinyl benzoate, vinyl 2-ethyl-hexanoate, vinyl stearate, and the vinyl ester of versatic acid. The most preferred vinyl ester monomers for use in the present invention is vinyl acetate. Typically, the amount of vinyl ester monomer (if used) present in the polymeric phase will range from 0 to 45 weight percent, preferably 0 to 35 weight percent, based on the total weight of the monomers.

The hydroxyalkyl(meth)acrylate monomers useful herein include hydroxyalkyl acrylate and methacrylate monomers based on ethylene oxide, propylene oxide, or other higher alkylene oxides, or mixturesthereof. Examples are hydroxyethyl acrylate, hydroxypropyl acrylate, hydroxyethyl methacrylate, hydroxypropyl methacrylate, and hydroxybutyl acrylate. Preferred hydroxyalkyl(meth)acrylate monomers are hydroxyethyl acrylate, hydroxypropyl acrylate, and hydroxybutyl acrylate. Typically, the amount of hydroxyalkyl(meth)acrylate monomer (if used) present in the polymeric phase will depend on the monomer chosen, however, the typical range will be from 0 to 15 weight percent, preferably 0 to 10 weight percent, most preferably 1 to 9 weight percent, based on the total weight of the monomers.

It has been found that the incorporation of hydroxyethyl acrylate in the polymer latex composition of the present invention further improves the dry pick strength up to about 28 percent. Therefore, the use of hydroxyethyl acrylate constitutes a particularly preferred embodiment of the present invention.

Alkoxyalkyl(meth)acrylate monomers useful in this invention include methoxyethyl methacrylate, ethoxyethyl methacrylate, methoxyethyl acrylate, ethoxyethyl acrylate, butoxyethyl methacrylate, methoxybutyl acrylate and methoxyethoxyethyl acrylate. Preferred alkoxyalkyl(meth)acrylate monomers are ethoxyethyl acrylate and methoxyethyl acrylate. Typically, the amount of alkoxyalkyl(meth)acrylate monomer (if used) present in the polymeric phase will depend on the monomer chosen, however, the typical range will be from 0 to 65 weight percent, preferably 0 to 45 weight percent, based on the total weight of the monomers.

(Meth)acrylamide monomers useful herein include the amides of $\alpha,\beta$-olefinically unsaturated carboxylic acids, such as, for example, acrylamide, methacrylamide and diacetone acrylamide. The preferred (meth)acrylamide monomer is acrylamide. Typically, the amount of (meth)acrylamide monomer (if used) present in the polymeric phase will depend on the monomer chosen, however, the typical range will be from 0 to 10 weight percent, preferably 0 to 5 weight percent, based on the total weight of the monomers.

In one embodiment, the polymer latex composition of the present invention comprises styrene, butadiene, itaconic acid, acrylic acid, and gum rosin chain transfer agent.

In another embodiment, the polymer latex composition of the present invention comprises styrene, butadiene, acrylonitrile, fumaric acid, and gum rosin chain transfer agent.

In a most preferred embodiment, the polymer latex composition of the present invention further comprises hydroxyethyl acrylate.

In general, the polymer latex composition of the present invention can be prepared by polymerization processes which are known in the art, and particularly by the known latex emulsion polymerization processes, including both seeded and unseeded latex polymerization. Representative processes include those described in U.S. Pat. Nos. 4,478,974; 4,751,111; 4,968,740; 3,563,946 and 3,575,913, and German Patent Publication No. 1,905,256. Such processes can be adapted as necessary to polymerize the above-described monomers. The method of introduction of the monomers and other ingredients, such as polymerization aids, is not particularly critical. The polymerization is then carried out under conventional conditions until the desired degree of polymerization is achieved. Crosslinkers and the well-known latex polymerization aids such as initiators, surfactants and emulsifiers can be used as needed.

Initiators useful in the practice of the present invention include water-soluble and/or oil-soluble initiators which are effective for purposes of polymerization. Representative initiators are well-known in the art and include, for example, thermal initiators that are oil-soluble, such as higher alkyl peroxides or azo compounds or thermal initiators which are water-soluble such as persulfate; redox pairs including sodium bisulfite and sodium persulfate, ferrous ions and a peroxide (Fenton's reagent), cuprous ions and peroxide, and ferrous ions and sodium persulfate wherein the peroxides can include benzoyl peroxide, hydrogen peroxide, or t-butyl peroxide. Examples of oil-soluble thermal initiators are azobisisobutyronitrile and t-butylperoctoate.

The initiator is employed in an amount sufficient to initiate the polymerization reaction at a desirable rate. In general, the amount of initiator will range from 0.05 to 5, preferably 0.1 to 4 weight percent, based on the weight of the total polymer. Most preferably, the amount of initiator is from 0.1 to 3 weight percent, based on the total weight of the polymer.

Crosslinkers useful in this invention include crosslinkable monomers, such as, for example, N-methylol acrylamide, N-methylol methacrylamide, glycidyl acrylate, glycidyl methacrylate, ethylene glycol dimethacrylate, allyl methacrylate, propylene glycol dimethacrylate, divinylbenzene; and acryloxy alkylsilanes, such as, for example, α-acryloxypropyl trimethoxysilane. Preferred crosslinkable monomers, for use in the present invention, are allyl methacrylate, glycidyl methacrylate, and acryloxy alkylsilanes. These crosslinkable monomers, if used, are typically employed at levels of from 0.05 to 10, preferably 0.05 to 5 weight percent, more preferably 0.05 to 2 weight percent, based on the weight of the total polymer.

Surfactants or emulsifiers suitable for use herein include those conventional surface active agents typically known in the art for polymerization processes. The surfactant(s) can be added to the aqueous phase and/or monomer phase. An effective amount of surfactant in a seeded process is that amount selected to assist in stabilizing the particle as a colloid, minimizing contact between the particles and preventing coagulation. In an unseeded process, an effective amount of surfactant will be that amount selected to influence the particle size.

Representative surfactants include saturated and ethylenically unsaturated sulfonic acids or salts thereof, including, for example, hydrocarbonsulfonic acids, such as, vinylsulfonic acid, allylsulfonic acid, and methallylsulfonic acid, and salts thereof; aromatic hydrocarbon-sulfonic acids, such as, for example, p-styrenesulfonic acid, isopropenylbenzene-sulfonic acid, and vinyloxybenzene-sulfonic acid, and salts thereof; sulfoalkyl esters of acrylic acid and methacrylic acid, such as, for example, sulfoethyl methacrylate and sulfopropyl methacrylate and salts thereof; and 2-acrylamido-2-methylpropanesulfonic acid and salts thereof; alkylated diphenyl oxide disulfonates, sodium dodecyl benzene sulfonates and dihexyl esters of sodium sulfosuccinic acid, ethoxylated alkyl phenols and ethoxylated alcohols.

The type and concentration of surfactant is typically dependent on the polymer solids level. A higher polymer solids level will generally increase the need for surfactant. Typically, the surfactant is employed in amounts of from 0.05 to 20, preferably from 0.05 to 10, more preferably from 0.05 to 5, parts by weight, based on the total weight of the monomers.

Various protective colloids may also be used in place or in addition to the surfactants described above. Suitable colloids include partially acetylated polyvinyl alcohol, casein, hydroxyethyl starch, carboxymethyl cellulose, hydroxyethyl cellulose, hydroxypropyl cellulose and gum arabic. The preferred protective colloids are carboxymethyl cellulose, hydroxyethyl cellulose and hydroxypropyl cellulose. In general, these protective colloids are used at levels of 0 to 10, preferably 0 to 5, more preferably 0 to 2 parts by weight, based on the total weight of the monomers.

Various other additives and ingredients known to those skilled in the art can be incorporated to prepare the latex compositions of the present invention. Such additives include, for example, anti-foaming agents, wetting agents, thickeners, plasticizers, fillers, pigments, crosslinkers, antioxidants and metal chelating agents may be used. Known anti-foaming agents include silicon oils and acetylene glycols. Common known wetting agents include alkylphenol ethoxylates, alkali metal dialkyl sulphosuccinates, acetylene glycols and alkali metal alkyl sulphates. Typical thickeners include polyacrylates, polyacrylamides, xanthan gums, modified celluloses or particulate thickeners such as silicas and clays. Typical plasticizers include mineral oil, liquid polybutenes, liquid polyacrylates and lanolin. Zinc oxide, titanium dioxide, aluminum hydrate, calcium carbonate, and clay are typically employed fillers.

The following examples are given to illustrate the invention and should not be interpreted as limiting it in any way. Unless stated otherwise, all parts and percentages are given by weight.

The monomers employed to prepare the latex compositions according to the present invention are chosen in such a manner to prepare latex compositions having a glass transition temperature ranging from −10° C. to 35° C.

EXAMPLE 1

A) Preparation of the Latex

A series of latices (Latices 1–16) is prepared by emulsion polymerizing a monomer composition of 57 weight percent styrene, 39 weight percent butadiene, 1 weight percent itaconic acid, 3 weight percent acrylic acid, in the presence of 0.6 parts by weight of surfactant DOWFAX® 2A1 (trademark of The Dow Chemical Company.) and varying amounts and types of rosin chain transfer agents. The polymerization is carried out as a seeded radical emulsion polymerization with a particle size range of 120 to 140 nanometers (nm) at a temperature between 80° C. to 90° C.

In Examples 11, 13 and 16 where 3 weight percent of 2-hydroxyethyl acrylate (HEA) is employed, the amount of styrene is decreased to 54 weight percent.

Comparative Examples A and B

The procedure of Example 1A is repeated using TDDM as chain transfer agent (Latex A) or no transfer agent (Latex B).

The latices 1 to 16, A and B are evaluated for their properties following the test procedures below and the results are shown in Table I.

Glass Transition Temperature (Tg)

The glass transition temperature is measured with a Differential Scanning Calorimeter DSC 30, commercially available from Mettler.

The latices are poured into 40 microliter (μl) aluminum cups, dried overnight at room temperature, and then for one hour at 100° C. to remove residual traces of moisture. The measurements are carried out in a temperature range of −30° C. to 70° C. at a heating rate of 10° C./min. The glass transition is given as the midpoint of the DSC curve.

Gel Content and Swelling Index

The gel content measures the solvent-insoluble fraction of the polymer. The swelling index measures the amount of solvent absorbed by the solvent-insoluble fraction of the polymer. For the determination of gel content and swelling index (SWI) of the polymer latices of the present invention, toluene is used as the solvent.

Dry films are made from the latices adjusted to pH 8. A dry latex film having a weight (A) is swollen for 24 hours with toluene. The toluene-insoluble wet gel is then separated by filtration and its weight determined (B). After drying the wet gel, the dry gel is determined (C).

The percent gel is given as:

$$\% \text{ gel} = \frac{\text{weight dry gel }(C)}{\text{weight of latex film }(A)} \times 100$$

The swelling index is given as:

$$SWI = \frac{\text{weight wet gel }(B) - \text{weight dry gel }(C)}{\text{weight of dry gel }(C)} \times 100$$

B) Preparation of Paper Coating Formulations

Latices A, 8, 9, 11, 12, and 13 are formulated into two types of formulations: a 100 percent clay formulation (Formulation I, 60 percent solids and pH 7.5) and a 50/50 percent clay/calcium carbonate formulation (Formulation II, 62 percent solids and pH 8.5). Each formulation is then coated onto base paper having a weight of 71 g/m² at a coat weight of 12 g/m².

The coated paper is evaluated according to the following test procedures and the results are shown in Table II.

Gloss

Gloss is measured using a Zehnter ZLR-1050 instrument at an angle of 75°. A black standard is used for calibration.

K & N (Percent Drop in Brightness)

This test measures the ability of the paper surface to absorb printing inks. The test is carried out on a Elrepho 2000 instrument.

K & N ink is applied with a metallic spatulum onto the lower half of a coated paper test strip. After 2 minutes of penetration time, the ink is wiped off with tissue paper. The brightness is then measured in both areas of the paper test strip, that is, the area with ink and the area without ink. To obtain the K & N percent drop in brightness, the brightness of the area with ink is subtracted from the brightness of the area without ink (original brightness) and the result divided by the original brightness multiplied by 100.

IGT Dry Pick

This test measures the ability of the paper surface to accept the transfer of ink without picking. The test is carried out on an A2-type printability tester, commercially available from Reprotest BV.

Coated paper test strips (4 mm×22 mm) are printed with inked aluminum printing disks at a printing pressure of 36 Newtons (N) with the pendulum drive system and the high viscosity test oil (red) from Reprotest BV. After the printing is completed, the distance where the coating begins to show damages is marked under a stereomicroscope. The marked distance is then transferred onto the IGT velocity curve and the velocities in cm/s are read on the used drive curve.

Wet Pick (NWP)

This test measures the occurrence of picking in the presence of water introduced in the printing process.

Two coated papertest strips are divided in three equal sections. The middle section of one strip is wetted with 12 mm³ of water. This strip is then printed with a test ink commercially available under the trade designation Huber Rupftestfarbe No. 3 and designated as "original print." Then, an off-print onto the second paper strip is made which is designated "off-print." The densities of both paper strips are measured with a densitometer using a red filter. The densitometer is commercially available from Gretag. The densities are measured at the side position of the original print (without water) (A), at the middle position of the original print (with water) (B), at the side position of the off-print (without water) (C), and at the middle position of the off-print (D). The wet pick is calculated using the following equation:

$$X = \text{ink transfer} = B/A \times 100(\%)$$

$$Y = \text{ink refusal} = \frac{100 - D - (X \times C)}{(100 \times A)} \times 100(\%)$$

$$Z = \text{wet pick} = 100 - X - Y(\%)$$

Ink Set-Off (ISO)

This test is used to determine the ink setting rate on paper surface. The test is carried out on a Pruefbau Test Printing unit.

Coated paper test strips (4.5 cm×23 cm) are inked with test paint commercially available under the trade designation Huber Wegschlagtestfarbe No. 520068 at a printing pressure of 1,000N and at a speed of 1.5 m/s. After printing, the test strips are transferred to the set-off disk. A standard set-off paper strip (commercial designation is Kunstdruckpapier APCO II/II 150 g/m², available from Scheufelen, Germany) is placed between the printed test strip and the set-off disk. After 15 seconds, the set-off disk is moved over the test area. The density of the set-off strip is measured with a densitometer from Gretag, using a blue filter.

Ink Gloss

This test is carried out on a Pruefbau Test Printing unit with Lorilleux Red Ink No. 8588.

0.8 g/m² ink are applied on coated paper test strips mounted on a long rubber former with a steel printing disk. The pressure of the inking system is 1,000N and the speed is 1 m/s. The printed strips are dried for 12 hours at 20° C./55 percent minimum room humidity. The gloss is then measured on a Zehnter ZLR-1050 instrument at an angle of 75°.

Odor Test

The odor of the clay coated paper samples of this invention is tested in odor panel sessions comparing the odor of these coated paper samples (test samples) with that of two mercaptan-free reference samples in a so-called "blind triangle test." The first task of each odor panel member is to identify the test sample from a set of three samples. Having completed this, each member is asked to give the identified sample a hedonic rating on a scale 1 to 5 (1=very unpleasant, 5=very pleasant). The reference sample is given a relative odor rating of 3. Each odor panel consisted of five experienced members.

The test results given in Table III indicate (1) whether a statistically significant identification of the test sample has been achieved, and, if so, (2) the average of the hedonic ratings of the panel members.

TABLE I

Latex Properties

| Latex or Comp. Ex. | Particle size (nm) | HEA[1] ppw[2] | Chain Transfer Agent (ppw) | Tg. °C. | Gel, % | SWI |
|---|---|---|---|---|---|---|
| A* | 140 | — | TTDM[3] (0.7) | 5.0 | 88 | 4.5 |
| B* | 140 | — | — | 15.5 | 100 | 3.4 |
| 1 | 140 | — | AbA[4] (0.5) | 12.6 | 95 | 3.0 |
| 2 | 140 | — | AbA (1.0) | 12.8 | 96 | 3.1 |
| 3 | 140 | — | AbA (1.5) | 12.1 | 94 | 3.7 |
| 4 | 140 | — | TOR[5] (1.5) | 10.4 | 97 | 2.5 |
| 5 | 140 | — | TOR (3.0) | 12.4 | 96 | 3.2 |
| 6 | 140 | — | S[6] | 12.9 | 96 | 2.5 |
| 7 | 140 | — | FL[7] | 14.6 | 96 | 2.5 |
| 8 | 140 | — | CGR[8] (3.0) | 8.0 | 94 | 4.1 |
| 9 | 120 | — | CGR (3.0) | 7.8 | 96 | 4.0 |
| 10 | 130 | — | CGR (4.5) | 8.7 | 90 | 5.1 |
| 11 | 120 | 3.0 | CGR (4.5) | 9.5 | 93 | 5.2 |
| 12 | 110 | — | CGR (4.5) | 9.8 | 92 | 4.8 |
| 13 | 110 | 3.0 | CGR (4.5) | 8.9 | 92 | 5.5 |
| 14 | 140 | — | CGR (6.0) | 8.8 | 87 | 6.0 |
| 15 | 120 | — | CGR (6.0) | 8.9 | 88 | 5.9 |
| 16 | 110 | 3.0 | CGR (6.0) | 8.7 | 88 | 7.4 |

*Not an example of the present invention.
[1]HEA is hydroxyethyl acrylate
[2]ppw is parts per weight, based on 100% monomers
[3]TDDM is tert-dodecylmercaptan
[4]AbA is sodium salt of abietic acid
[5]TOR is tall oil rosin
[6]S is a partially hydrogenated rosin, commercially available from Hercules Inc. under the trade designation Staybelite
[7]FL is a hydrogenated rosin, commercially available from Hercules Inc. under the trade designation FORAL AX-E
[8]CGR is chinese gum rosin As readily apparent from the data in Table I, the use of chinese gum rosin (CGR) has a pronounced effect on the gel content and the polymer swelling: Increasing amounts of CGR lead to a decrease in gel content, whereas the swelling index is increased. Moreover, the glass transition temperatures are not significantly influenced by varying the amounts of CGR. Furthermore, a comparison of Example 12 with Example 13 clearly demonstrate the additional benefit obtained by the incorporation of 3.0 parts by weight of hydroxyethyl acrylate.

TABLE II

Properties of The Paper Coating Formulations

| Form. or Comp. Form. | Gloss, % | K & N, % | IGT, cm/s | NWP % | ISO density | Ink Gloss, % |
|---|---|---|---|---|---|---|
| A-I* | 66 | 5.6 | 75 | 45 | 0.27 | 82 |
| 8-I | 66 | 6.1 | 75 | 54 | 0.25 | 84 |
| 9-I | 67 | 5.2 | 80 | 54 | 0.30 | 83 |
| 11-I | 63 | 5.9 | 92 | 52 | 0.32 | 81 |
| 12-I | 63 | 4.8 | 80 | 42 | 0.31 | 82 |
| 13-I | 65 | 5.4 | 102 | 55 | 0.31 | 83 |
| A-II* | 63 | 10.6 | 100 | 36 | 0.14 | 81 |
| 8-II | 63 | 10.1 | 83 | 72 | 0.07 | 82 |
| 9-II | 64 | 9.2 | 93 | 56 | 0.07 | 82 |
| 11-II | 61 | 10.0 | 100 | 36 | 0.14 | 78 |
| 12-II | 61 | 10.2 | 93 | 36 | 0.10 | 81 |
| 13-II | 62 | 5 | 104 | 16 | 0.08 | 80 |

*Not an example of the present invention.

As apparent from the data shown in Table II, the use of chinese gum rosin does not affect significantly the gloss, K & N, ISO and ink gloss properties of the coating formulations. To the contrary, if compared to Comparative Formulations A-I and A-II, the coating formulations of the present invention show comparable good properties. Further improvements are observed when 2-hydroxyethyl acrylate is incorporated in the latex composition.

TABLE III

| Latex | Statistically significant identification | Odor Rating |
|---|---|---|
| A* | Yes | 1.94 |
| 9 | No | — |
| 12 | Yes | 2.8 |

*Not an example of the present invention.

As readily apparent from Table III, the paper coated with latex containing TDDM (Comparative Example A) has given an inferior odor rating compared to the paper coated with the TDDM-free reference latex. The paper coated with the gum rosin modified latex of the present invention (Latex 9), however, showed no differentiation compared to the paper coated with the TDDM-free reference latex. The paper coated with the gum rosin modified latex of the present invention (Latex 12), shows a similar odor rating compared to the paper coated with the TDDM-free reference latex, and a superior odor rating compared to the paper coated with the latex containing TDDM (Comparative Example A).

EXAMPLE 2

A) Preparation of the Latex

Another series of latices (Latices 17–20) is prepared following the procedure of Example 1A.

In Examples 17 and 19 where 3 weight percent of 2-hydroxyethyl acrylate (HEA) is employed, the amount of styrene is decreased to 54 weight percent.

Comparative Examples C and D

The procedure of Example 1A is repeated using TDDM as chain transfer agent (Latices C) or no transfer agent (Latex D).

The ILatices 17–20, C and D are evaluated for their properties and the results are shown in Table IV.

B) Preparation of Paper Coating Formulations

Latices 25–28 and C and D are formulated into two types of formulations: a 100 percent clay formulation (Formulation I, 60 percent solids and pH 7.5) and a 50/50 percent clay/calcium carbonate formulation (Formulation II, 62 percent solids and pH 8.5). Each formulation is then coated onto base paper having a weight of 71 g/m² at a coat weight of 12 g/m².

The coated paper is evaluated according to the following test procedures and the results are shown in Table V.

TABLE IV

LATEX PROPERTIES

| Latex or Comp. Ex. | Particle size (nm) | HEA[1] ppw[2] | Chain Transfer Agent (ppw) | Tg, °C. | Gel, % | SWI |
|---|---|---|---|---|---|---|
| C* | 140 | — | TTDM[3] (0.7) | 5.7 | 85 | 5.9 |
| D* | 140 | — | — | 12.3 | 97 | 1.8 |
| 17 | 120 | 3.0 | CGR[4] (1.0) | 7.7 | 96 | 3.0 |
| 18 | 120 | — | CGR (1.0) | 10.9 | 96 | 3.0 |
| 19 | 120 | 3.0 | CGR (9.0) | 8.0 | 83 | 8.8 |
| 20 | 120 | — | CGR (9.0) | 6.5 | 83 | 7.9 |

*Not an example of the present invention.
[1]HEA is hydroxyethyl acrylate
[2]ppw is parts per weight, based on 100% monomers

TABLE IV-continued

LATEX PROPERTIES

| Latex or Comp. Ex. | Particle size (nm) | HEA[1] ppw[2] | Chain Transfer Agent (ppw) | Tg, °C. | Gel, % | SWI |
| --- | --- | --- | --- | --- | --- | --- |

[3]TDDM is tert-dodecylmercaptan
[4]CGR is chinese gum rosin

As readily apparent from the data in Table IV, the use of chinese gum rosin (CGR) influences effect on the gel content and the polymer swelling. According to the results given in Table I, increasing amounts of CGR lead to a decrease in gel content and to an increase in the swelling index. Thus, latices containing as little as 1 part by weight of CGR (Examples 17 and 18) show an increase in swelling compared to a latex without a chain transfer agent (Comparative Example D). At the same time, latices containing as much as 9 parts by weight of CGR (Examples 19 and 20) show even lower gel contents and much higher swelling indices than a mercaptan chain transferred latex (Comparative Example C).

TABLE V

Properties of The Paper Coating Formulations

| Form. or Comp. Form. | Gloss, % | K & N, % | IGT, cm/s | NWP, % | ISO density | Ink Gloss, % |
| --- | --- | --- | --- | --- | --- | --- |
| C-I* | 73 | 7.5 | 67 | 42 | 0.54 | 86 |
| D-I* | 75 | 5.5 | 38 | 90 | 0.22 | 89 |
| 17-I | 71 | 4.3 | 67 | 72 | 0.39 | 89 |
| 18-I | 72 | 5.0 | 67 | 69 | 0.42 | 89 |
| 19-I | 73 | 6.0 | 80 | 59 | 0.52 | 89 |
| 20-I | 73 | 5.4 | 75 | 56 | 0.51 | 91 |
| C-II* | 68 | 9.9 | 92 | 52 | 0.15 | 83 |
| D-II* | 70 | 10.6 | 41 | 95 | 0.04 | 84 |
| 17-II | 67 | 5.3 | 71 | 85 | 0.09 | 87 |
| 18-II | 69 | 6.6 | 62 | 81 | 0.05 | 83 |
| 19-II | 64 | 10.4 | 103 | 40 | 0.05 | 79 |
| 20-II | 64 | 9.2 | 77 | 20 | 0.03 | 79 |

*Not an example of the present invention.

As apparent from the data shown in Tables IV and V, latices containing as little as one part gum rosin already show a substantial improvement in dry and wet pick compared to a latex prepared without a chain transfer agent. Furthermore, even at higher concentrations, that is, 9 parts rosin, the latices prepared according to the present invention show dry pick advantages in Formulation I and wet pick advantages in Formulation II compared to a latex prepared with a mercaptan-based chain transfer agent.

EXAMPLE 3

A) Preparation of the Latex

Another series of latices (Latices 21 and 22) is prepared by emulsion polymerizing a monomer composition of 49 weight percent styrene, 35 weight percent butadiene, 13 weight percent acrylonitrile and 3 weight percent fumaric acid, in the presence of 0.52 parts by weight of surfactant DOWFAX® 2A1 (trademark of The Dow Chemical Co.) and 6 parts by weight of gum rosin chain transfer agent. The polymerization is carried out as in Example 1A at a temperature of 85° C.

Comparative Example E

The procedure of Example 3A is repeated except for using carbontetrachloride (CTC) as chain transfer agent (Latex E).

The latices 21, 22, and E are evaluated for their properties and the results are shown in Table VI.

B) Preparation of Paper Coating Formulations

Latices 21, 22, and E are formulated into formulations I and II following procedures of Examples 1 B and also a 30/70 percent clay/calcium carbonate formulation (Formulation III, 63 percent solids and pH 8.5). The formulation is then coated onto base paper having a weight of 71 $g/m^2$ at a coat weight of 12 $g/m^2$.

The coated paper is evaluated according to the above-described test procedures and the results are shown in Table VII.

TABLE VI

LATEX PROPERTIES

| Latex or Comp. Ex. | Particle size (nm) | VCN[1] ppw[2] | Chain Transfer Agent (ppw) | Tg, °C. | Gel, % | SWI |
| --- | --- | --- | --- | --- | --- | --- |
| E* | 160 | 13 | CTC[3] (6.0) | 24 | 84 | 6.2 |
| 21 | 100 | 13 | CGR[4] (6.0) | 30 | 94 | 4.0 |
| 22 | 130 | 13 | CGR (6.0) | 28 | 93 | 4.0 |

*Not an example of the present invention.
[1]VCN = acrylonitrile
[2]CGR = chinese gum rosin
[3]CTC = carbontetrachloride
[4]CGR = chinese gum rosin

TABLE VII

PROPERTIES OF THE PAPER COATING FORMULATIONS

| Form. or Comp. Form. | Gloss, % | K & N, % | IGT, cm/s | NWP % | ISO density | Ink Gloss, % |
| --- | --- | --- | --- | --- | --- | --- |
| E-I* | 76 | 9.5 | 68 | 46 | 0.71 | 92 |
| 21-I | 75 | 8.7 | 46 | 28 | 0.69 | 90 |
| 22-I | 77 | 6.5 | 43 | 81 | 0.58 | 89 |
| E-II* | 70 | 14.5 | 78 | 4 | 0.24 | 88 |
| 21-II | 71 | 11.7 | 51 | 5 | 0.35 | 87 |
| 22-II | 71 | 13.9 | 61 | 7 | 0.15 | 86 |
| E-III* | 67 | 17.1 | 91 | 3 | 0.14 | 81 |
| 21-III | 64 | 16.0 | 83 | 5 | 0.07 | 81 |
| 22-III | 67 | 16.0 | 77 | 31 | 0.05 | 82 |

*Not an example of the present invention.

We claim:

1. A polymer latex composition having a glass transition temperature between −10° C. and 70° C. prepared with a chain transfer agent, comprising, in polymerized form, (A) from 10 weight percent to 80 weight percent of monovinylidene aromatic monomer(s); (B) from 20 weight percent to 65 weight percent of conjugated diene monomer(s); (C) from 0 weight percent to 70 weight percent of acrylate monomer(s); and (D) the remaining amount of polymerizable comonomer(s); wherein the chain transfer agent consists of a sulfur- and halogen-free abietic acid-containing rosin.

2. Polymer latex composition of claim 1 wherein the sulfur- and halogen-free chain transfer agent is an abietic acid-containing gum rosin.

3. Polymer latex composition of claim 1 or 2 wherein component (A) is styrene, component (B) is butadiene, and component (D) is an ethylenically unsaturated carboxylic acid.

4. Polymer latex composition of claim 3 further comprising from 1 to 9 weight percent, based on the total weight of the monomers, of a hydroxyalkyl(meth)acrylate monomer.

5. Polymer latex composition of claim 4 wherein the hydroxyalkyl(meth)acrylate monomer.

6. Polymer latex composition of claim 5 wherein the monomer composition is styrene, butadiene, itaconic acid, acrylic acid, and gum rosin.

7. Polymer latex composition of claim 6 further comprising hydroxyethyl acrylate.

8. Polymer latex composition of claim 5 wherein component (C) is a nitrile monomer and is employed in amount of 1–20 weight percent.

9. Polymer latex composition of claim 8 wherein the nitrile monomer is acrylonitrile.

10. Polymer latex composition of claim 9 wherein the monomer composition is styrene, butadiene, acrylonitrile, fumaric acid, and gum rosin.

11. Polymer latex composition of claim 1 wherein the sulfur- and halogen-free chain transfer agent is an abietic acid-containing gum rosin having a color grade of K, M, N, WG, WW or X.

12. Polymer latex composition of claim 11 wherein component (A) is styrene, component (B) is butadiene, and component (D) is an ethylenically unsaturated carboxylic acid.

13. Polymer latex composition of claim 12 further comprising from 1 to 9 weight percent, based on the total weight of the monomers, of a hydroxyalkyl(meth)acrylate monomer.

14. Polymer latex composition of claim 13 wherein the hydroxyalkyl(meth)acrylate monomer is hydroxyethyl acrylate.

15. A polymer latex composition having a glass transition temperature between −10° C. and 70° C. prepared with a chain transfer agent, the composition consisting essentially of, in polymerized form, (A) from 10 weight percent to 80 weight percent of monovinylidene aromatic monomer(s); (B) from 20 weight percent to 65 weight percent of conjugated diene monomer(s); (C) from 0 weight percent to 70 weight percent of acrylate monomer(s); and (D) the remaining amount of other polymerizable comonomer(s); wherein the chain transfer agent consists of a sulfur- and halogen-free abietic acid-containing rosin.

16. Polymer latex composition of claim 15 wherein the sulfur- and halogen-free chain transfer agent is an abietic acid-containing gum rosin having a color grade of K, M, N, WG, WW or X.

17. Polymer latex composition of claim 15 or 16 wherein component (A) is styrene, component (B) is butadiene, and component (D) is an ethylenically unsaturated carboxylic acid.

18. Polymer latex composition of claim 17 further comprising from 1 to 9 weight percent, based on the total weight of the monomers, of a hydroxyalkyl(meth)acrylate monomer.

19. The composition of claim 18 wherein the hydroxyalkyl(meth)acrylate monomer is hydroxyethylacrylate, and the remaining monomers are styrene, butadiene, itaconic acid, and acrylic acid.

* * * * *

UNITED STATES PATENT AND TRADEMARK OFFICE
CERTIFICATE OF CORRECTION

PATENT NO. : 5,837,762
DATED : November 17, 1998
INVENTOR(S) : Stollmaier et al.

It is certified that error appears in the above-identified patent and that said Letters Patent is hereby corrected as shown below:

<u>Column 12, claim 5,</u>
Line 67, please insert -- is hydroxyethyl acrylate --. at the end of the sentence.

Signed and Sealed this

Twenty-seventh Day of November, 2001

Attest:

NICHOLAS P. GODICI
Attesting Officer     Acting Director of the United States Patent and Trademark Office